United States Patent
Kishi et al.

(10) Patent No.: US 10,859,006 B2
(45) Date of Patent: Dec. 8, 2020

(54) THROTTLE GRIP DEVICE USING MAGNET

(71) Applicant: TOYO DENSO KABUSHIKI KAISHA, Minato-ku (JP)

(72) Inventors: Shoji Kishi, Tsurugashima (JP); Toshiya Yoshida, Tsurugashima (JP); Takayuki Otani, Tsurugashima (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/507,320

(22) Filed: Jul. 10, 2019

(65) Prior Publication Data
US 2020/0018242 A1   Jan. 16, 2020

(30) Foreign Application Priority Data

Jul. 11, 2018 (JP) ................................ 2018-131487

(51) Int. Cl.
| | | |
|---|---|---|
| *F02M 1/00* | (2006.01) | |
| *F02D 11/10* | (2006.01) | |
| *G01B 7/30* | (2006.01) | |
| *F02D 11/02* | (2006.01) | |

(52) U.S. Cl.
CPC .............. *F02D 11/10* (2013.01); *F02D 11/02* (2013.01); *G01B 7/30* (2013.01)

(58) Field of Classification Search
CPC ... G01B 7/30; G01B 7/14; G05G 1/08; G05G 1/00; B62K 23/04; F02D 11/10
USPC ............ 123/462; 324/207.2, 207.11, 207.13, 324/207.25
See application file for complete search history.

(56) References Cited

U.S. PATENT DOCUMENTS

| | | | | |
|---|---|---|---|---|
| 9,933,281 | B2* | 4/2018 | Nomura | B62K 23/04 |
| 2010/0268431 | A1* | 10/2010 | Itagaki | F02D 11/02 |
| | | | | 701/93 |
| 2012/0266717 | A1* | 10/2012 | Sakai | B62K 11/14 |
| | | | | 74/551.9 |
| 2013/0257416 | A1* | 10/2013 | Nomura | B62K 23/04 |
| | | | | 324/207.13 |
| 2014/0103916 | A1* | 4/2014 | Nomura | F02D 11/02 |
| | | | | 324/207.25 |
| 2019/0094008 | A1* | 3/2019 | Kishi | B62K 23/04 |
| 2020/0110113 | A1* | 4/2020 | Akiyoshi | F02D 11/107 |

FOREIGN PATENT DOCUMENTS

JP   2010-151019   7/2010

* cited by examiner

*Primary Examiner* — John Kwon
(74) *Attorney, Agent, or Firm* — Cozen O'Conner (57) ABSTRACT

Provided is a throttle grip device that can stably generate an operation feeling and achieves downsizing itself. A throttle grip device includes a throttle grip attached to a handlebar, an accelerator position sensor, and a return spring. The accelerator position sensor and the return spring are accommodated inside the handlebar so as to be arranged tandemly along a straight line. The accelerator position sensor includes a cylindrical inner rotor in which a plurality of magnetic poles is magnetized along a circumferential direction, a magnetic material-made outer case configured to accommodate the inner rotor, and a sensor IC disposed facing a sensor side end of the inner rotor and offset from a central axis of the inner rotor. The inner rotor rotates in conjunction with the throttle grip.

10 Claims, 13 Drawing Sheets

THROTTLE GRIP DEVICE USING MAGNET

BACKGROUND OF THE INVENTION

Field of the Invention

The present invention relates to a throttle grip device using a magnet.

Description of the Related Art

Conventionally, a throttle grip device for controlling an opening angle of a throttle valve (accelerator opening angle) by a driver is provided on a right-hand side one of handlebars of a motorcycle. The throttle grip device includes a throttle grip configured to rotate around a central axis of a cylindrical handlebar in response to a driver's operation, and a return spring configured to urge the rotated throttle grip so as to be returned to its initial position. The throttle grip is connected by a wire to a throttle valve provided in an intake manifold or the like, rotation of the throttle grip is transmitted by the wire to the throttle valve, and the throttle valve opens and closes in accordance with the rotation of the throttle grip.

When connecting the throttle grip and the throttle valve using a wire, the driver obtains a linear operational feeling regarding the accelerator opening angle, but if the driver mistakenly operates the throttle grip, the throttle valve is unnecessarily opened, power which is more than necessary is supplied from the engine, and thus movement of a vehicle might become unstable.

Therefore, in recent years, a throttle grip device has been used to control opening and closing of a throttle valve by converting a rotation angle of a throttle grip into an electrical signal and transmitting the electrical signal to an ECU without using a wire. This throttle grip device includes an accelerator position sensor using a magnetic sensor and a magnet. The accelerator position sensor outputs the rotation angle of the throttle grip as an electric signal by detecting change in the direction and the density of magnetic lines of the magnet rotating in conjunction with the rotation of the throttle grip by the magnetic sensor. Because when using the accelerator position sensor, the opening angle of the throttle valve can be controlled irrespectively of the rotation of the throttle grip, the ECU can control the opening angle of the throttle valve to perform traction control (mainly slip control) or a plurality of operation modes (for example, a fuel consumption-sensitive mode or a response-sensitive mode). In addition, when using the accelerator position sensor which means no wire is required, it thus improves the degree of freedom in layout on a vehicle body, and it achieves to reduce the its weight, and further, it enables to prevent failures from occurring due to wire cutting.

Incidentally, in the conventional throttle grip device, frictional resistance due to rubbing of the wire when the throttle grip is operated imparts a sense of operation (operation feeling) to the driver. In contrast, since the accelerator position sensor cannot impart such an operation feeling to the driver, the throttle grip device using the accelerator position sensor is provided with a generation mechanism of friction that generates friction when the throttle grip rotates, and it imparts the operation feeling to the driver by the friction thus generated (see, Japanese Laid-Open Patent Publication (Kokai) No. 2010-151019). The generation mechanism of friction includes, for example, a rotatable friction plate that rotates in conjunction with the rotation of the throttle grip, and a fixed friction plate fixed to a handlebar so as to be slidably contact with the rotatable friction plate.

However, in the generation mechanism of friction, the rotatable friction plate and the fixed friction plate are worn out as the cumulated number of times of the operation of the throttle grip increases, so it changes the operation feeling imparted to the driver. In addition, loss of appropriate friction caused by damage on either one of the rotatable friction plate and the fixed friction plate may not be capable of imparting an appropriate operation feeling to the driver since the contact of those two plates generates the friction. Furthermore, it is necessary to arrange the rotatable friction plate and the fixed friction plate, thus, it can hardly downsize the throttle grip device.

SUMMARY OF THE INVENTION

The present invention provides a throttle grip device that can stably generate an operation feeling and can achieve downsizing itself.

According to an aspect of the present invention, there is provided a throttle grip device comprising a throttle grip attached to a cylindrical handlebar so as to be rotatable around a central axis thereof, a return spring configured to urge the throttle grip to return to its initial position, and an accelerator position sensor. The accelerator position sensor and the return spring are accommodated inside the handlebar so as to be arranged tandemly along a straight line, the accelerator position sensor includes a magnet extending along the central axis, a cylindrical member made of a magnetic material accommodating the magnet, and a magnetic sensor disposed to face an end of the magnet. In the magnet, a plurality of magnetic poles is magnetized along a rotation direction around the central axis, and the magnet is configured to rotate in conjunction with the throttle grip.

According to the present invention, the magnetic sensor detects a rotation angle of the magnet rotating in conjunction with the throttle grip based on changes in the direction and density of the magnetic line. In addition, the cylindrical member is magnetized by the magnet and the magnetic force generates a resistance force against the rotation of the magnet. The resistance force against the rotation of the magnet imparts an operation feeling to the driver. That is, the operation feeling can be imparted to the driver using the magnet for detecting the rotation angle of the throttle grip, thus, there is no need to use the friction plate to impart the operation feeling to the driver, and the operation feeling can be stably provided. Further, because one single magnet is able to achieve both detection of the rotation angle of the throttle grip and impartment of the operation feeling to the driver, the number of the components of the throttle grip device can be reduced thereby being capable of attaining downsizing itself.

Further, features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. However, the configurations described in the following embodiments are merely examples, and the scope of the present invention is not limited to the configurations described in the embodiments.

Figure 1:
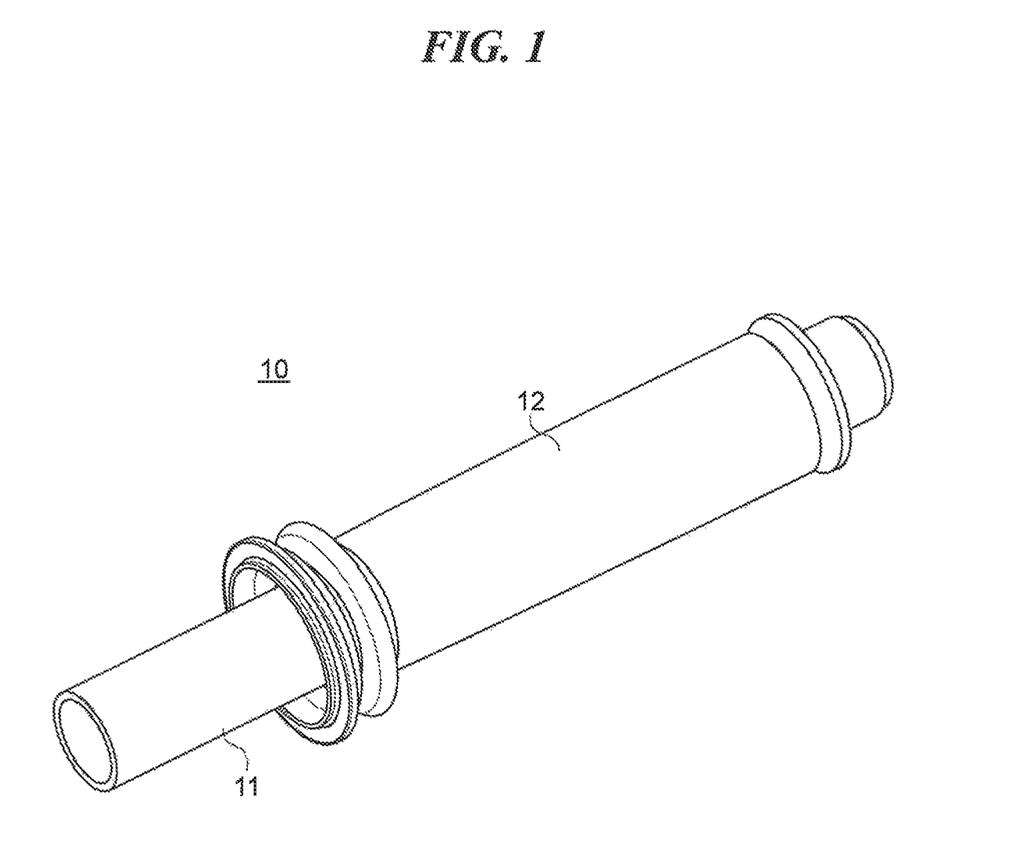
FIG. 1 is a perspective view schematically illustrating a configuration of a throttle grip device according to an embodiment of the present invention.

FIG. 1 is a perspective view schematically illustrating a configuration of a throttle grip device according to the present embodiment. In FIG. 1, a throttle grip device 10 includes a cylindrical handlebar 11 and a throttle grip 12 attached to the outer side of the handlebar 11 so as to be rotatable around the central axis of the handlebar 11. The throttle grip 12 is rotated around the central axis of the handlebar 11 by a desired rotation angle in response to a driver's operation, and after completion of the operation, the throttle grip 12 is returned to its initial position by a return spring 13 described later.

Figure 2:
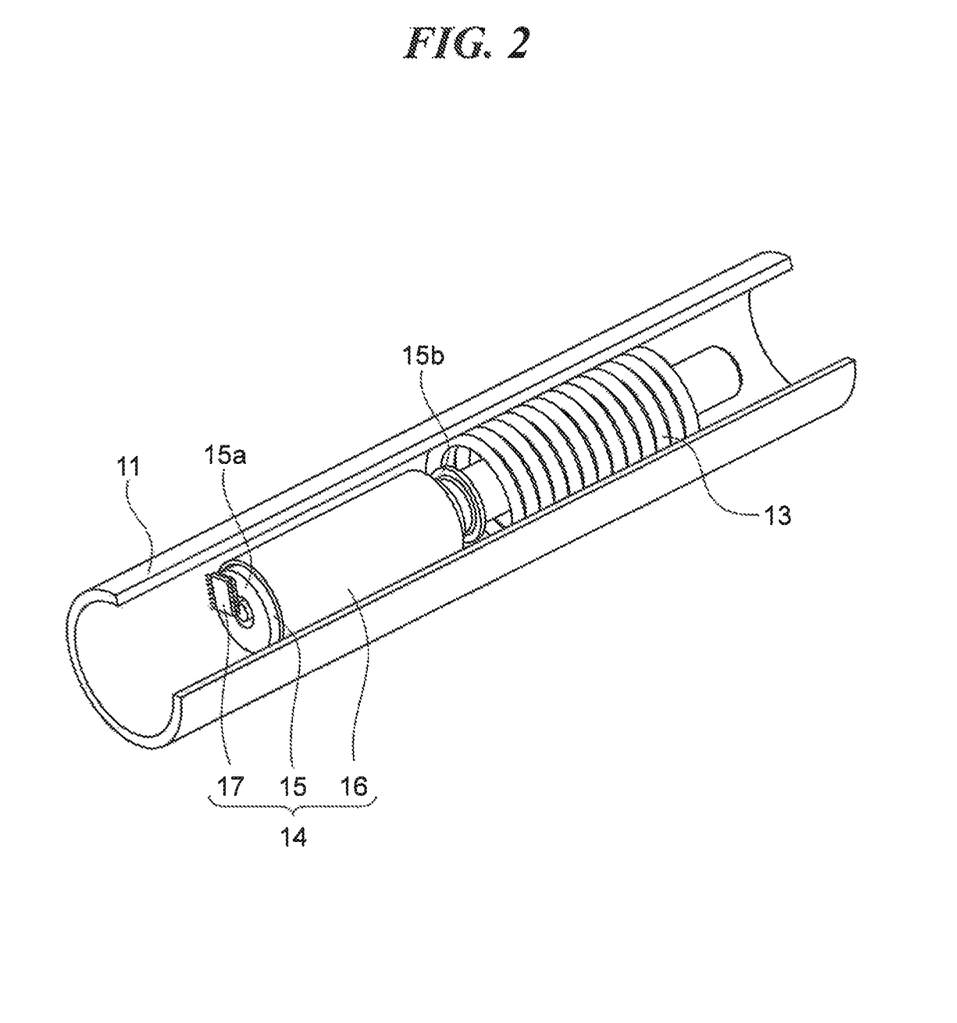
FIG. 2 is a perspective view illustrating an accelerator position sensor and a return spring which are accommodated inside a handlebar in FIG. 1.

FIG. 2 is a perspective view illustrating an accelerator position sensor and a return spring that are accommodated inside the handlebar in FIG. 1. In FIG. 2, part of the handlebar is removed to make the inside of the handlebar visually confirmable, and parts other than the main parts are omitted. In FIG. 2, a return spring 13 and an accelerator position sensor 14 are accommodated inside the handlebar 11. The return spring 13 is engaged with the throttle grip 12 by an engagement mechanism (not shown) to urge the throttle grip 12 so as to be returned to its initial position. The accelerator position sensor 14 includes an inner rotor 15 consisting of a cylindrical magnet extending along the central axis of the handlebar 11, an outer case 16 (cylindrical member) consisting of a cylindrical magnetic material (for example, a soft magnetic material or a semi-hard magnetic material) that accommodates the inner rotor 15, and a sensor IC 17 (magnetic sensor) facing an end (hereinafter referred to as "sensor side end") 15a of the inner rotor 15 and being disposed offset from the central axis of the inner rotor 15. In the inner rotor 15, a plurality of magnetic poles is magnetized along a circumferential direction, that is, a rotation direction around the central axis of the handlebar 11, the intensity of the magnetic force of each magnetic pole is the same, and the sensor IC 17 has a Hall element, and detects a direction and strength of magnetic lines passing through itself. The magnet forming the inner rotor 15 may have a round bar shape extending along the central axis of the handlebar 11. Also, the sensor IC 17 may have a magnetoresistive element, a magneto-impedance element, or a superconducting quantum interference device instead of the Hall element. The inner rotor 15 is engaged with the throttle grip 12 by an engagement mechanism (not shown) to rotate in conjunction with the throttle grip 12. In the throttle grip device 10, the speed ratio of the inner rotor 15 to the throttle grip 12 is 1. Inside the handlebar 11, the return spring 13 faces an end (hereinafter referred to as "opposite end") 15b of the inner rotor 15 which is opposite to the sensor side end 15a, and the accelerator position sensor 14 and the return spring 13 are arranged tandemly along a straight line. The outer case 16 and the sensor IC 17 are fixed to the handlebar 11 and do not rotate in conjunction with the throttle grip 12, thus, the inner rotor 15 rotates relative to the outer case 16 and the sensor IC 17. As described above, since the plurality of magnetic poles is magnetized along the circumferential direction in the inner rotor 15, each part in the outer case 16 is magnetized to a magnetic pole opposite to each magnetic pole of the opposing inner rotor 15. When the inner rotor 15 rotates relative to the outer case 16, each part of the magnetized outer case 16 generates a magnetic force to inhibit the rotation. The inner rotor 15 is engaged with the throttle grip 12 by the engagement mechanism, so that the magnetic force is transmitted to the throttle grip 12 as a resistance force to impart an operation feeling to a driver who operates the throttle grip 12.

Figure 3A:
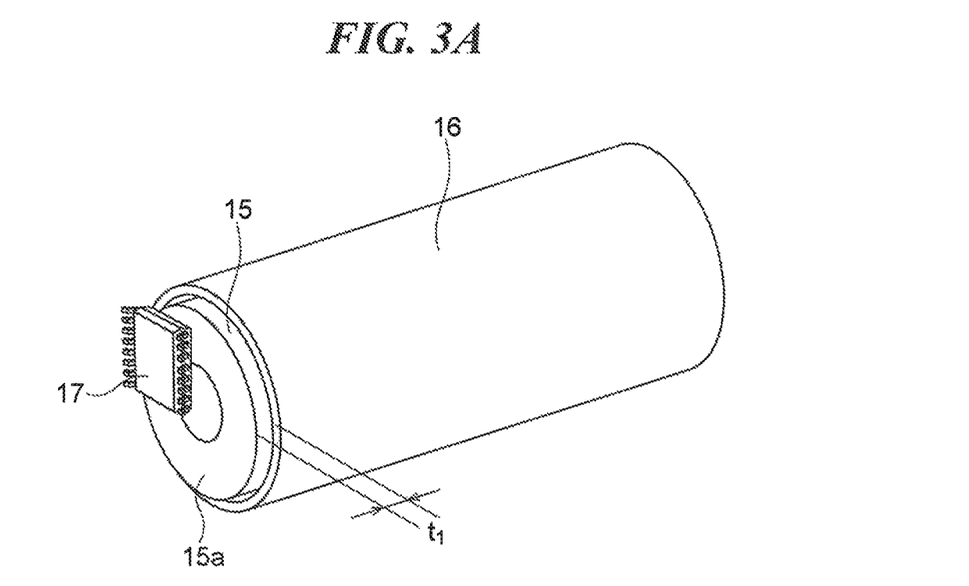
FIGS. 3A and 3B are perspective views illustrating the relative positional relation of an inner rotor as a magnet and an outer case as a cylindrical member in the accelerator position sensor.
Figure 3B:
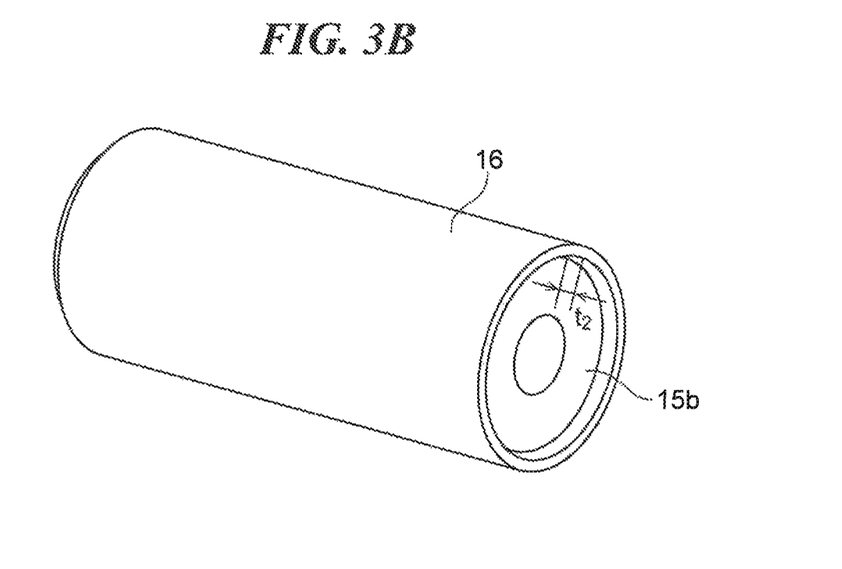

FIG. 3A and FIG. 3B are perspective views illustrating the relative positional relation of the inner rotor and the outer case in the accelerator position sensor. FIG. 3A illustrates near the sensor side end of the inner rotor, and FIG. 3B illustrates near the opposite end of the inner rotor. As illustrated in FIGS. 3A and 3B, the inner rotor 15 is disposed coaxially with the outer case 16. Further, the overall length (length along the central axis) of the inner rotor 15 is substantially equal to the overall length of the outer case 16, and most of the inner rotor 15 is accommodated in the outer case 16.

However, each end of the inner rotor 15 is not aligned with each end of the outer case 16, but, for example, as illustrated in FIG. 3A, the sensor side end 15a is to project from the end of the outer case 16. A protrusion length $t_1$ of the sensor side end 15a from the end of the outer case 16 preferably measures at least 1 mm. Further, as illustrated in FIG. 3B, the opposite end 15b of the inner rotor 15 is covered by the end of the outer case 16. The end of the outer case 16 preferably protrudes from the opposite end 15b of the inner rotor 15, and a protrusion length $t_2$ of the end of the outer case 16 from the opposite end 15b preferably measures at least 1 mm.

Figure 4:
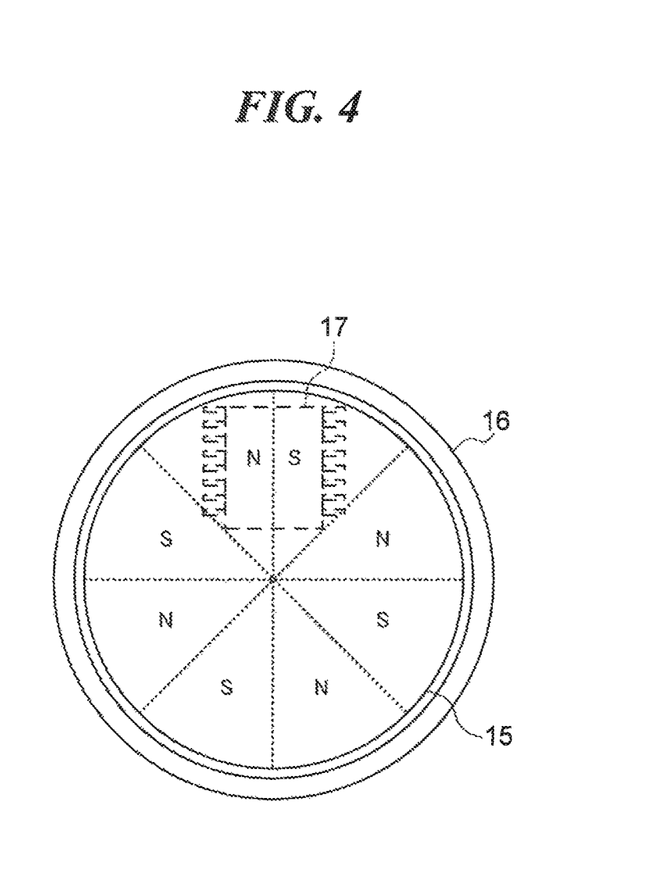
FIG. 4 is a view illustrating the positional relation of the inner rotor and a sensor IC as a magnetic sensor as seen from a sensor side end along a central axis.

FIG. 4 is a view illustrating the positional relation of the inner rotor and the sensor IC as seen from the sensor side end along the central axis. As illustrated in FIG. 4, in the inner rotor 15, eight magnetic poles are magnetized along the circumferential direction, and the sensor IC 17 is disposed to face the sensor side end 15a of the inner rotor 15.

When the sensor IC 17 is disposed to face the sensor side end 15a, not only magnetic lines generated between two given magnetic poles (N pole and S pole) but also magnetic lines generated between other two magnetic poles may also pass through the sensor IC 17. The direction of the magnetic lines generated between the two given magnetic poles and the direction of the magnetic lines generated between the other two magnetic poles are different, thus, these magnetic lines cancel each other. As a result, the magnetic lines passing through the sensor IC 17 are reduced, and it leads to desensitization in the magnetic flux detection of the sensor IC 17.

In contrast, in the present embodiment, the sensor IC 17 is disposed offset from the central axis of the inner rotor 15. With this, most of the magnetic lines passing through the sensor IC 17 are occupied by magnetic lines generated between the two magnetic poles facing the sensor IC 17. As a result, in the sensor IC 17, the magnetic lines generated between the two magnetic poles are not canceled by the magnetic lines generated between the other two magnetic poles, and it restrains the desensitization in the magnetic flux detection of the sensor IC 17.

Further, as illustrated in FIG. 4, when the inner rotor 15 is seen from the sensor side end 15a along the central axis, the sensor IC 17 and the inner rotor 15 overlap each other. Thus, it is capable of downsizing of the throttle grip device 10 by accommodating the sensor IC 17 and the inner rotor 15 inside the cylindrical handlebar 11.

Figure 5:
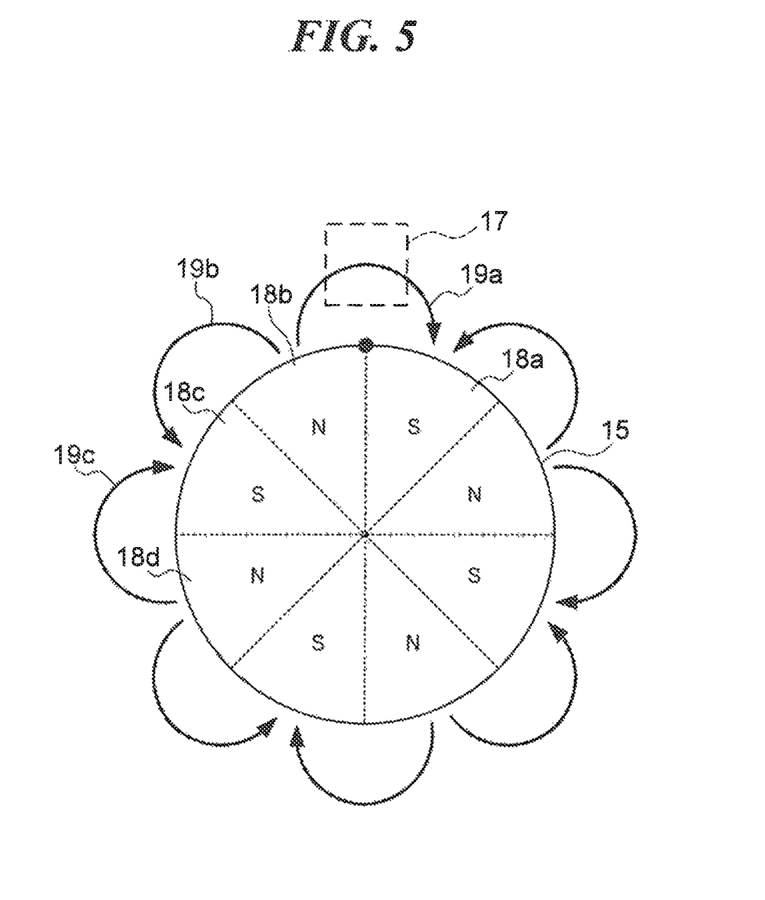
FIG. 5 is a view illustrating a detection method of a rotation angle of a throttle grip by using the accelerator position sensor.
Figure 6:
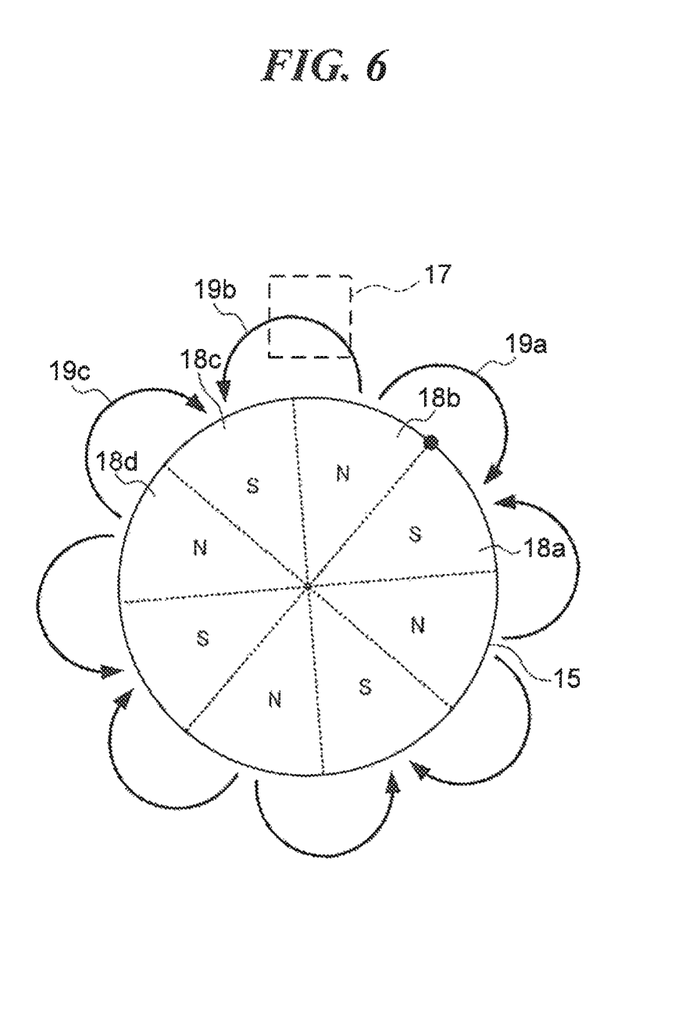
FIG. 6 is a view illustrating a detection method of a rotation angle of the throttle grip by using the accelerator position sensor.
Figure 7:
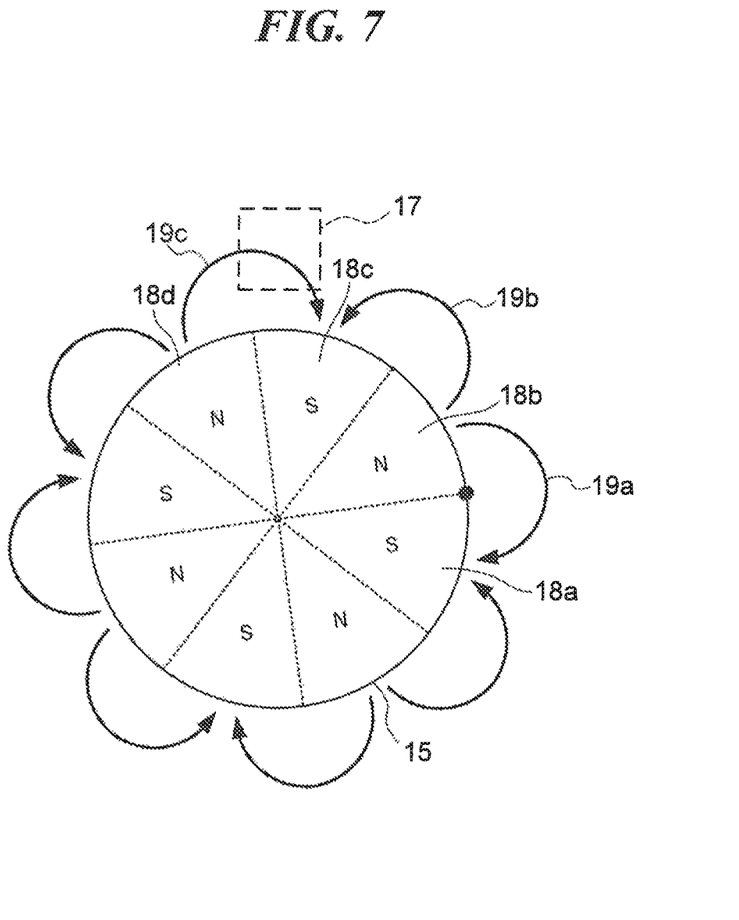
FIG. 7 is a view illustrating a detection method of a rotation angle of the throttle grip by using the accelerator position sensor.

FIGS. 5 to 7 are views illustrating a detection method of a rotation angle of the throttle grip by using the accelerator position sensor. In the following drawings, the same one point in the inner rotor 15 is indicated by the symbol "●" to get a better grasp of a rotation status of the inner rotor 15. Further, the sensor IC 17 is illustrated as being shifted to the outside of the inner rotor 15 to get a better grasp of changes in directions of the magnetic lines passing through the sensor IC 17.

First, as illustrated in FIG. 5, when the inner rotor 15 is located at its initial position (hereinafter referred to as "initial state"), a magnetic line 19a generated between two magnetic poles 18a and 18b facing the sensor IC 17 passes through the sensor IC 17. Thereafter, following the driver's operation of the throttle grip 12, the inner rotor 15 rotates in a clockwise direction in the figure, and as illustrated in FIG. 6, when the sensor IC 17 faces to two magnetic poles 18b and 18c, a magnetic line 19b generated between the two magnetic poles 18b and 18c passes through the sensor IC 17. The magnetic poles 18a and 18c are S poles whereas the magnetic pole 18b is an N pole, then, the magnetic line 19a extends in the opposite direction to the magnetic line 19b.

Further, when the inner rotor 15 rotates in the clockwise direction in the figure, as illustrated in FIG. 7, the sensor IC 17 faces two magnetic poles 18c and 18d, and a magnetic line 19c generated between the two magnetic poles 18c and 18d passes through the sensor IC 17. The magnetic poles 18b and 18d are N poles whereas the magnetic pole 18c is an S pole, and then, the direction of the magnetic line 19b extends in the opposite direction to the magnetic line 19c.

That is, as the inner rotor 15 rotates in the clockwise direction in the figure, the direction and density of magnetic lines passing through the sensor IC 17 continuously change. The sensor IC 17 detects changes in the direction and density of the magnetic lines to output the rotation angle as an electrical signal calculated using an inverse trigonometric function based on the detection. In the present embodiment, the rotation ratio of the inner rotor 15 to the throttle grip 12 is 1 as described above, therefore, the sensor IC 17 outputs, to ECU etc., the calculated rotation angle of the inner rotor 15 as a rotation angle of the throttle grip 12.

In order to impart an appropriate operation feeling to the driver, the number of magnetizations (the number of magnetic poles) in the inner rotor 15 preferably needs to be increased, so that it strengthen a magnetic force (resistance force) generated between the outer case 16 and the inner rotor 15. However, an issue here arises in detection of the rotation angle of the inner rotor 15 (throttle grip 12) when preferably increasing the number of magnetic poles in the inner rotor 15 in order for the driver's operation feeling to be appropriate.

Figure 8A:
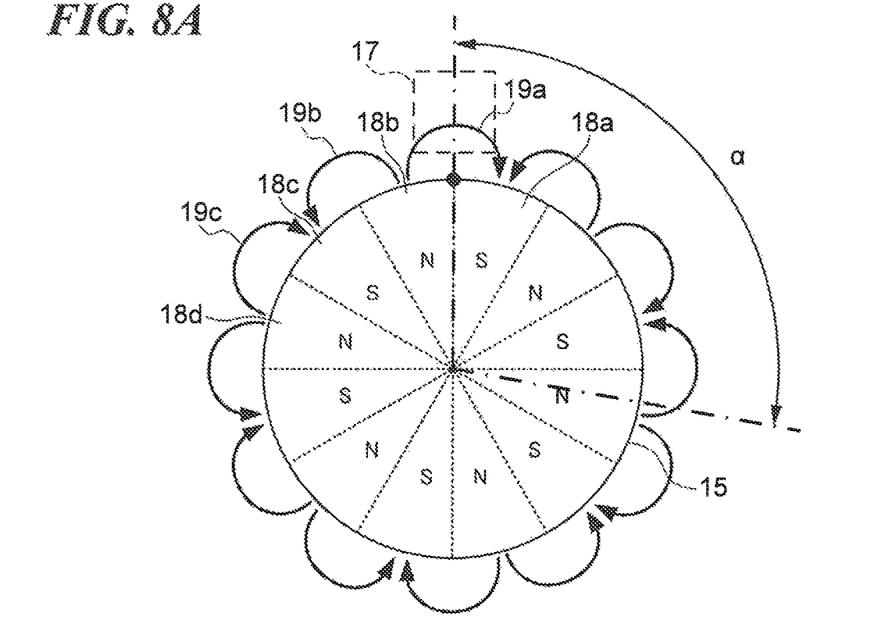
FIGS. 8A and 8B are views illustrating an issue in detecting the rotation angle of the inner rotor.
Figure 8B:
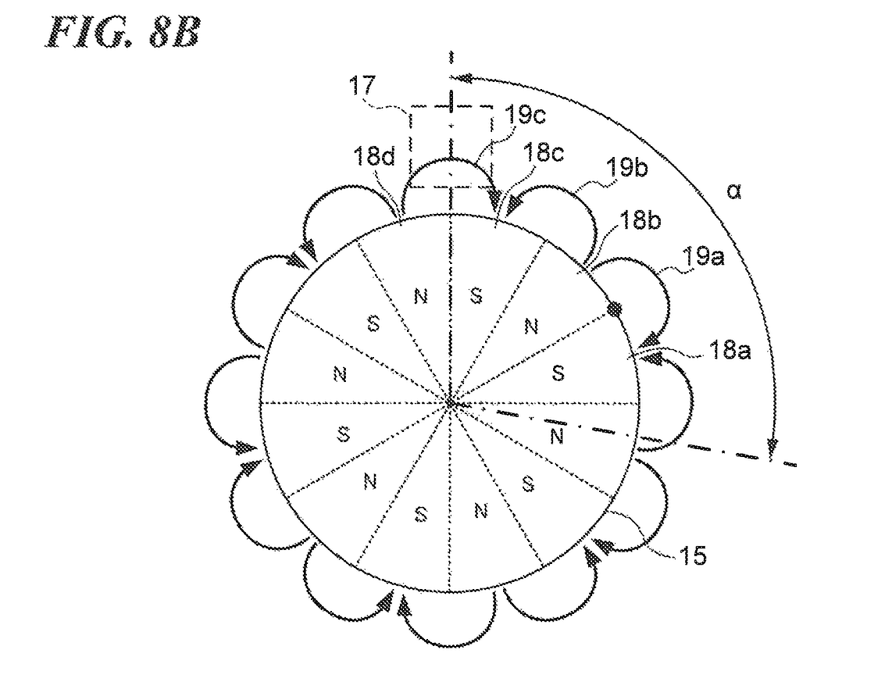

FIGS. 8A and 8B are views illustrating an issue in the detection of the rotation angle of the inner rotor. A description will be given below when a rotation angle α of the throttle grip 12, which needs to be detected for controlling opening and closing of the throttle valve (hereinafter referred to as "required angle for detection"), is 100° whereas the inner rotor 15 is magnetized to an N pole or an S pole in every 30° to increase the number of magnetizations for the appropriate operation feeling, for example. In the following figures, the range of the required angle for detection α is indicated by dot-and-dash lines.

First, as illustrated in FIG. 8A, in its initial state, the magnetic line 19a generated between the two magnetic poles 18a and 18b facing the sensor IC 17 passes through the sensor IC 17. Thereafter, following the driver's operation of the throttle grip 12, the inner rotor 15 rotates approximately by 60° in the clockwise direction in the figure, and as illustrated in FIG. 8B, when the sensor IC 17 faces the two magnetic poles 18c and 18d, the magnetic line 19c generated between the two magnetic poles 18c and 18d passes through the sensor IC 17. The positional relation of the sensor IC 17 and the two magnetic poles 18c and 18d is the same as the positional relation of the sensor IC 17 and the two magnetic poles 18a and 18b in its initial state, the magnetic poles 18a and 18c are S poles, the magnetic poles 18b and 18d are N poles, and the intensity of the magnetic force of each of the magnetic poles 18a to 18d is the same. Therefore, the direction and density of the magnetic line 19c passing through the sensor IC 17 are the same as the ones of the magnetic line 19a passing through the sensor IC 17 in its initial state. As a result, the sensor IC 17 outputs the same electric signal as in its initial state before the throttle grip 12 rotates by the required angle for detection α, and therefore, detection errors occurred in the rotation angle of the throttle grip 12.

To cope with this issue, in the present embodiment, a plurality of magnetic poles is magnetized in the inner rotor 15 to avoid the same positional relation of sensor IC 17 and the two magnetic poles within the range of the required angle for detection α of throttle grip 12. For example, description will be given of a case where the inner rotor 15 is rotated when, in its initial state, the sensor IC 17 faces the boundary between the N pole and the S pole, and the N pole is located on the left-hand side and the S pole is located on the right-hand side as seen from the sensor IC 17. In this case, in order to avoid reproduction of the same positional relation of the sensor IC 17 and the two magnetic poles, the inner rotor 15 may not be rotated to the state in which the sensor IC 17 faces the boundary between the N pole and the S pole, and the N pole is located on the left-hand side and the S pole is located on the right-hand side as seen from the sensor IC 17 again. That is, the rotation angle of the inner rotor 15 may be set to be smaller than the angle formed by two adjacent N pole and S pole around the central axis of the inner rotor 15. Here, the rotation angle of the inner rotor 15 corresponds to the required angle for detection α of the throttle grip 12, and therefore, in other words, the required angle for detection α of the throttle grip 12 may be set to be smaller than the angle formed by the two adjacent N pole and S pole in the inner rotor 15 around the central axis of the inner rotor 15.

Figure 9A:
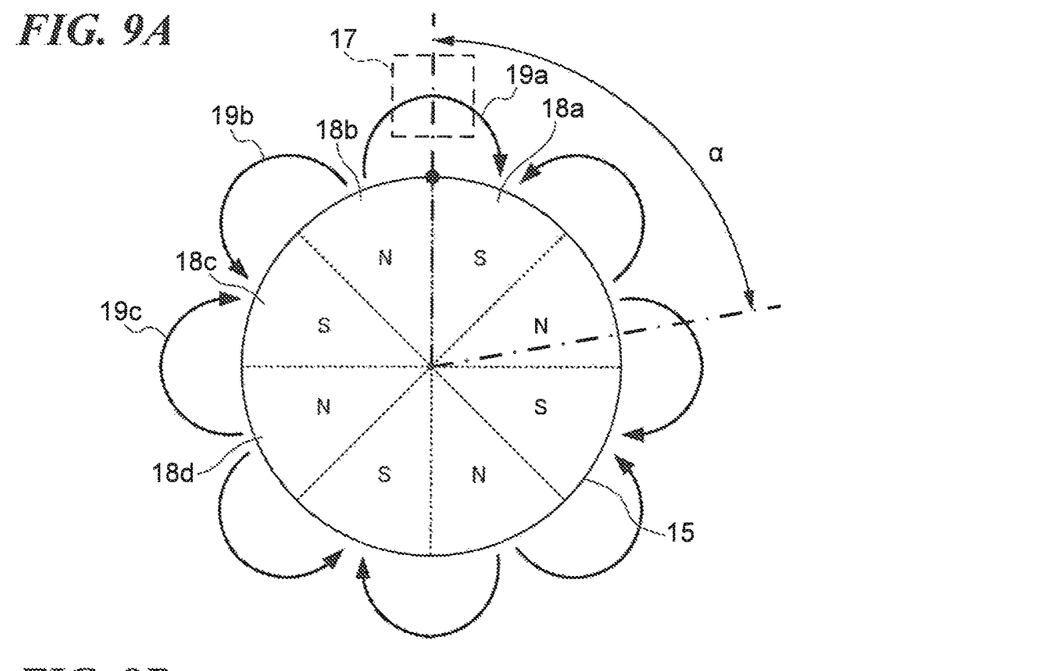
FIGS. 9A and 9B are views illustrating an example of the relation of a required angle for detection of the throttle grip and magnetization of the inner rotor in the present embodiment.
Figure 9B:
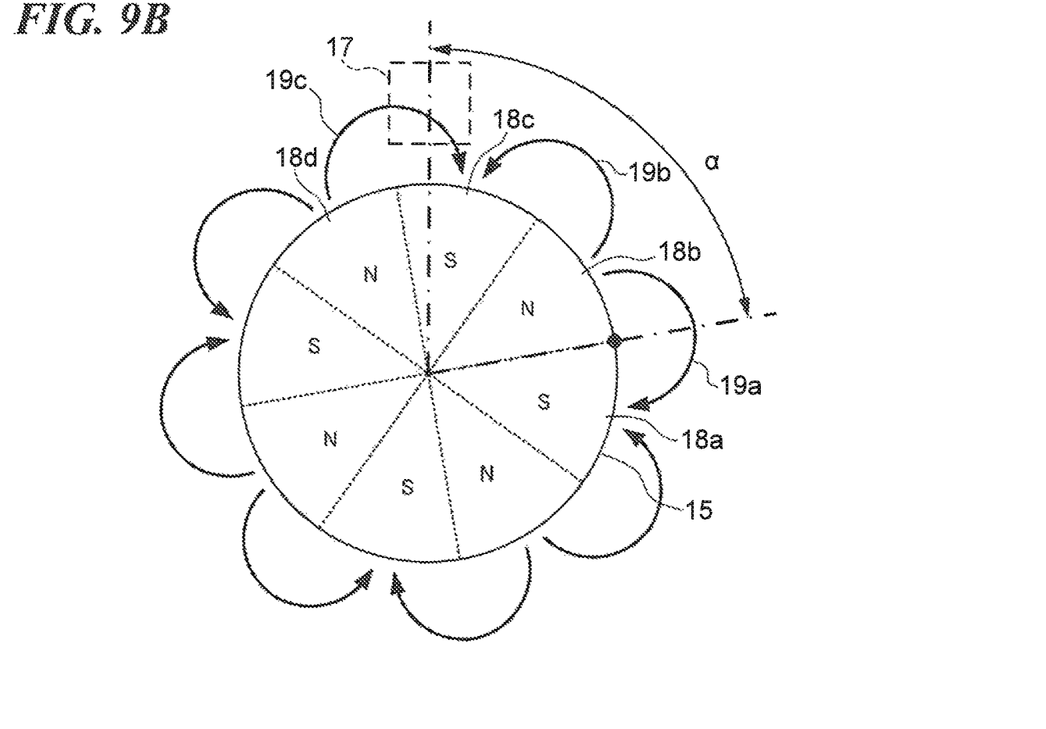

FIGS. 9A and 9B are views illustrating the relation of a required angle for detection the throttle grip and magnetization in the inner rotor in the present embodiment. In FIGS. 9A and 9B, for example, description will be given of a case where the inner rotor 15 is magnetized to an N pole or an S pole every 45°, and the required angle for detection α is set to 80°, which is smaller than 90° being an angle formed by the two adjacent N pole and S pole in the inner rotor 15 around the central axis of the inner rotor 15.

First, as illustrated in FIG. 9A, in its initial state, the sensor IC 17 faces the boundary between the two magnetic poles 18a and 18b, and the magnetic line 19a generated between the two magnetic poles 18a and 18b passes through the sensor IC 17. Thereafter, although the driver's operation of the throttle grip 12 rotates the inner rotor 15 in the clockwise direction in the figure by the required angle for detection α, as illustrated in FIG. 9B, the sensor IC 17 does not face the boundary between the two magnetic poles 18c and 18d, but faces those two magnetic poles 18c and 18d which generate the magnetic line 19c therebetween passing through the sensor IC 17. That is, the positional relation of the sensor IC 17 and the two magnetic poles 18c and 18d at this time is different from the positional relation of the sensor IC 17 and the two magnetic poles 18a and 18b in its initial state. Therefore, the direction and density of the magnetic line 19c passing through the sensor IC 17 are different from the ones of the magnetic line 19a passing through the sensor IC 17 in its initial state. As a result, the sensor IC 17 does not output the same electric signal as in its initial state even when the throttle grip 12 rotates at around the required angle for detection α. Therefore, detection errors can be prevented in the rotation angle of the throttle grip 12.

As described above, in the present embodiment, no detection errors occurred in the throttle grip 12 when setting the required angle for detection α of the throttle grip 12 to be smaller than the angle formed by the two adjacent N pole and S pole in the inner rotor 15 around the central axis of the inner rotor 15.

More examples may be expected in the required angle for detection α and the magnetization of the inner rotor 15 in accordance with the required angle for detection α other than the above-described examples.

Figure 10:
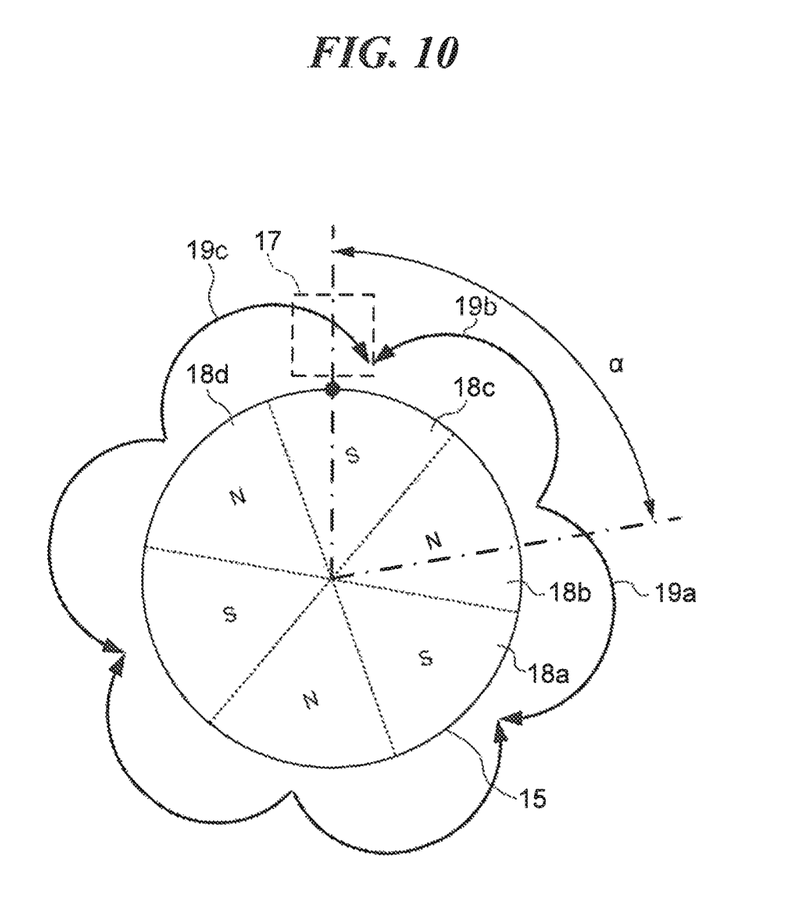
FIG. 10 is a view illustrating an example of the relation of the required angle for detection of the throttle grip and the boundary between two magnetic poles in the inner rotor.

For example, as illustrated in FIG. 10, the inner rotor 15 may be magnetized to an N pole or an S pole every 60° whereas the required angle for detection α may be set to 80° being smaller than 120° which is the angle formed by the two adjacent N pole and S pole in the inner rotor 15 around the central axis of the inner rotor 15. In this case, a status once occurs in which only the boundary between the magnetic poles 18b and 18c exists within the range of the required angle for detection α while rotating the inner rotor 15.

Figure 11:
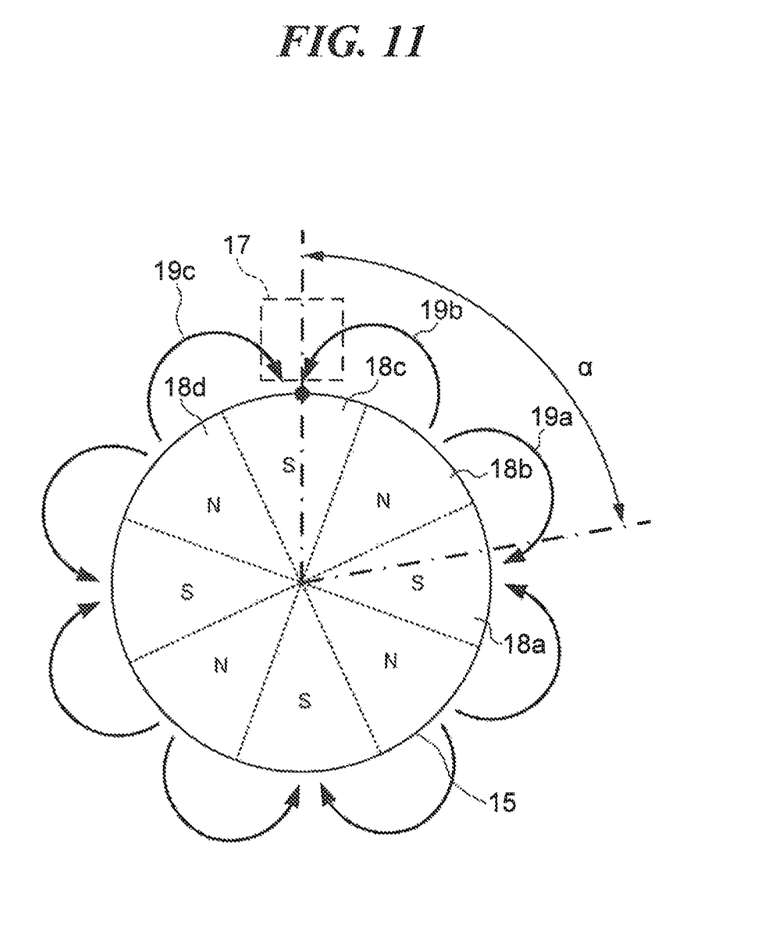
FIG. 11 is a view illustrating an example of the relation of the required angle for detection of the throttle grip and the boundary between two magnetic poles in the inner rotor.

Further, as illustrated in FIG. 11, the inner rotor 15 may be magnetized to an N pole or an S pole every 45° whereas the required angle for detection α may be set to 80° being smaller than 90° which is the angle formed by the two adjacent N pole and S pole in the inner rotor 15 around the central axis of the inner rotor 15. In this case, a status once occurs in which the boundary between the magnetic poles 18a and 18b and the boundary between the magnetic poles 18b and 18c exist within the range of the required angle for detection α while rotating the inner rotor 15. It should be noted that, when rotating the inner rotor 15 in the counterclockwise direction a little further from the state of FIG. 11, a status occurs in which only the boundary between the magnetic poles 18a and 18b exists within the range of the required angle for detection α.

Figure 12:
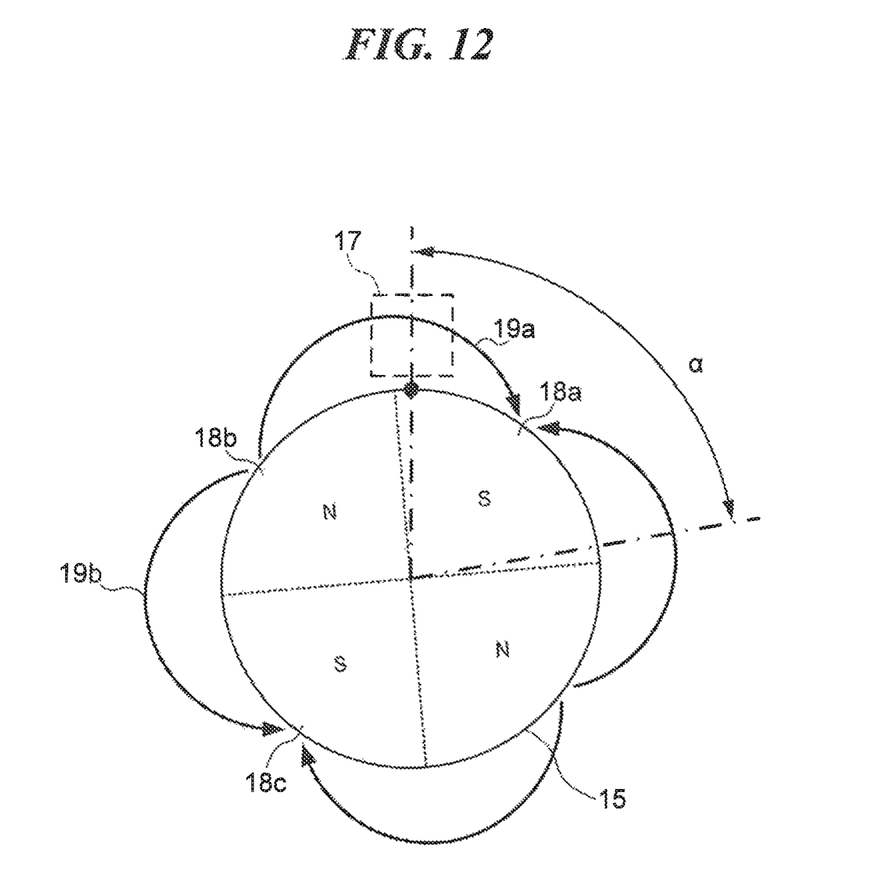
FIG. 12 is a view illustrating an example of the relation of the required angle for detection of the throttle grip and the boundary between two magnetic poles in the inner rotor.

Moreover, as illustrated in FIG. 12, the inner rotor 15 may be magnetized to an N pole or an S pole every 90° whereas the required angle for detection α may be set to 80° being smaller than 180° which is the angle formed by the two adjacent N pole and S pole in the inner rotor 15 around the central axis of the inner rotor 15. In this case, a status once occurs in which no boundary between the two magnetic poles exist within the range of the required angle for detection α while rotating the inner rotor 15. It should be noted that, when rotating the inner rotor 15 in the clockwise direction a little further from the state of FIG. 12, a status occurs in which only the boundary between the magnetic poles 18a and 18b exists within the range of the required angle for detection α.

There is no detection error occurred in the rotation angle of the throttle grip 12 since the required angle for detection α of the throttle grip 12 is smaller than the angle formed by the two adjacent N pole and S pole in the inner rotor 15 around the central axis of the inner rotor 15. However, among FIGS. 10 to 12 described above, in order to impart an appropriate operation feeling to the driver, the case of FIG. 11 having the largest number of magnetizations in the inner rotor is preferable the most.

According to the throttle grip device 10 described above, the sensor IC 17 detects rotation of the inner rotor 15 rotating in conjunction with the throttle grip 12 based on changes in the direction of the magnetic line and its density. The outer case 16 is magnetized by the inner rotor 15, and a resistance force against the rotation of the inner rotor 15 is generated by the magnetic force. Then, the resistance force against the rotation of the inner rotor 15 imparts an operation feeling to the driver. That is, the inner rotor 15, which detects the rotation angle of the throttle grip 12, enables to impart an appropriate operation feeling to the driver so that a friction plate is not necessary and a certain operation feeling can be stably provided. Further, one single inner rotor 15 is capable of detecting the rotation angle of the throttle grip 12 as well as imparting a operation feeling to the driver, thereby it achieves downsizing the throttle grip 12 by reduction of its components.

Further, in the throttle grip device 10, protrusion of the sensor side end 15a of the inner rotor 15 from the end of the outer case 16 prevents absorption of the magnetic lines near the sensor IC 17 into the magnetic material of the outer case 16. Thus, it enables to prevent reduction of the magnetic lines passing through the sensor IC 17 to ensure the detection of the rotation of inner rotor 15 by the sensor IC 17.

Furthermore, in the throttle grip device 10, the opposite end 15b of the inner rotor 15 is covered by the end of the outer case 16 which is certainly capable of absorbing the magnetic lines near the opposite end 15b. Thus, it enables to generate a sufficient magnetic resistance force by prompting magnetization of the outer case 16.

Finally, in the throttle grip device 10, the sensor IC and the return spring are not necessarily provided outside the handlebar 11 by arranging the accelerator position sensor 14 and the return spring 13 accommodated inside the handlebar 11 while aligning them, thereby it achieves downsizing of the throttle grip device 10.

Although the preferable embodiment of this invention has been described above, this invention is not limited to the embodiment mentioned above, but can be modified and changed variously within the scope of the gist thereof.

For example, the inner rotor 15 may not have a cylindrical shape or a round bar shape, but may have a prismatic shape, as long as a plurality of magnetic poles is magnetized along the circumferential direction, for example. On the other hand, the end of the outer case 16 may not be cut off in a plane perpendicular to the central axis, but may be cut off in a plane inclined to the central axis, for example.

Figure 13:
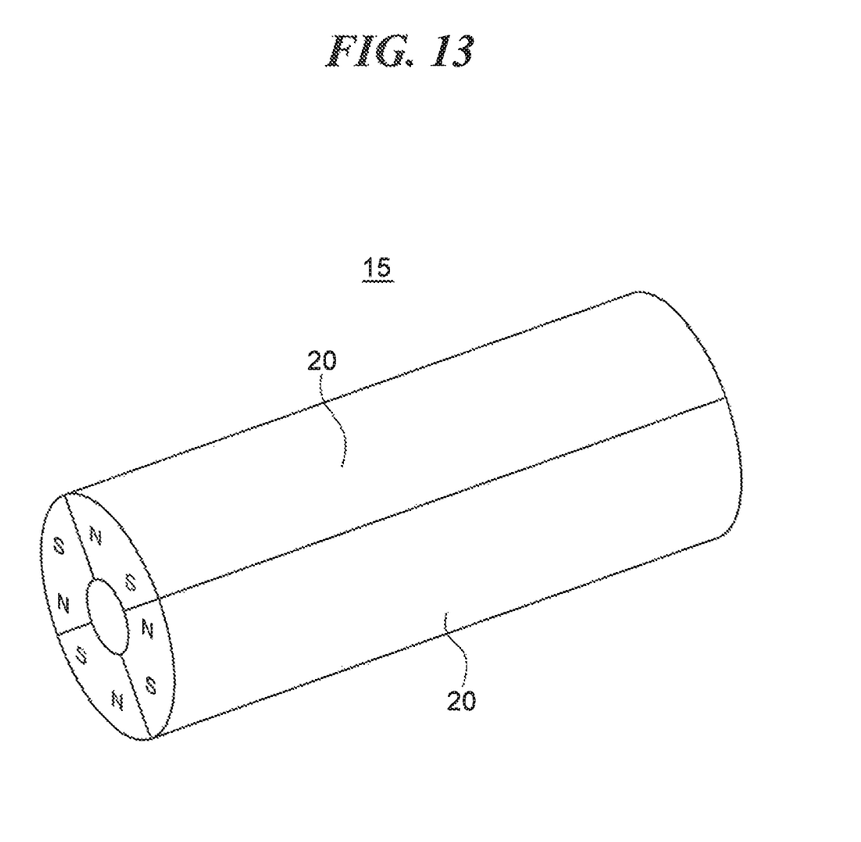
FIG. 13 is a perspective view schematically illustrating a configuration of a variation of the inner rotor.

Furthermore, as illustrated in FIG. 13, the inner rotor 15 may be formed by a plurality of elongated magnets 20 which is arranged and bundled along the central axis of the handlebar 11, whereas a plurality of magnetic poles is magnetized to one single magnet in the inner rotor 15.

This application claims the benefit of Japanese Patent Application No. 2018-131487 filed on Jul. 11, 2018 which is hereby incorporated by reference herein in its entirety.

What is claimed is:

1. A throttle grip device comprising:
a throttle grip attached to a cylindrical handlebar so as to be rotatable around a central axis thereof;
a return spring configured to urge the throttle grip to return to its initial position; and
an accelerator position sensor,
wherein:
the accelerator position sensor and the return spring are accommodated inside the handlebar so as to be arranged tandemly along a straight line;
the accelerator position sensor includes a magnet extending along the central axis, a cylindrical member made of a magnetic material accommodating the magnet, and a magnetic sensor disposed to face an end of the magnet;
in the magnet, a plurality of magnetic poles is magnetized along a rotation direction around the central axis;
the magnet is configured to rotate in conjunction with the throttle grip;
each part in the cylindrical member is magnetized to a magnetic pole opposite to each magnetic pole of the opposing magnet; and
when the magnet rotates relative to the cylindrical member, each part of the magnetized cylindrical member generates a magnetic force to inhibit a rotation of the magnet.

2. The throttle grip device according to claim 1, wherein the magnetic sensor is disposed offset from a central axis of the magnet.

3. The throttle grip device according to claim 1, wherein a rotation angle of the throttle grip which needs to be detected is smaller than an angle formed by two adjacent magnetic poles in the magnet around a central axis of the magnet.

4. The throttle grip device according to claim 1, wherein the magnet is arranged with respect to the cylindrical member such that the number of boundaries of the magnetic poles within a range of a rotation angle of the throttle grip which needs to be detected is two or less.

5. The throttle grip device according to claim 1, wherein an end of the magnet facing the magnetic sensor protrudes from the cylindrical member.

6. The throttle grip device according to claim 1, wherein an end of the magnet which is located at the opposite side of an end of the magnet facing the magnetic sensor is covered by the cylindrical member.

7. The throttle grip device according to claim 1, wherein the magnetic sensor and the magnet overlap each other when the magnet is seen along the central axis.

8. The throttle grip device according to claim 1, wherein the magnetic sensor has either one of a Hall element, a magnetoresistive element, a magneto-impedance element, or a superconducting quantum interference device.

9. The throttle grip device according to claim 1, wherein the magnet has a cylindrical shape extending along the central axis.

10. The throttle grip device according to claim 1, wherein the magnet has a round bar shape extending along the central axis.

* * * * *